Patented Jan. 2, 1945

2,366,651

UNITED STATES PATENT OFFICE 2,366,651

REGENERATION OF IONIC EXCHANGERS

Franklin N. Rawlings, Westport, Conn., assignor to The Dorr Company, New York, N. Y., a corporation of Delaware Application June 19, 1942, Serial No. 447,653

2 Claims. (Cl. 23—50)

This invention relates to ionic exchange processes whereby dissolved ionic matter is removed from liquids by the chemical mechanism of ionic exchange.

The essence of such a process is that the solution to be treated, and which is herein termed the primary solution, is contacted with an ion exchanging material usually granular and herein called an exchanger. The exchanger has the capacity of taking up one of the ions of an ionized compound or salt in the solution, and in turn giving correspondingly charged ions of another kind back into the solution. In this way an ionic compound in the solution can have one of its ions replaced by an ion of another kind.

If a cation exchanger is used, the exchange takes place between cations in which case the original anion of the compound remains in the solution. If an anion exchanger is used, the exchange takes place between anions, in which case the original cation of the compound remains in the solution. In this manner an ion not desired in the solution is exchanged for another ion desired from the exchanger, and the ions to be removed from the solution are gradually collected in the exchanger. The function of the exchanger so far may be said to represent its active operating phase in distinction from the regenerating phase presently to be described.

Exchange capacity must first be created or established in the exchanger, and if it has been diminished or exhausted it must be regenerated by causing the exchanger to take up and accumulate or by supplying it with those ions which it is to give off in exchange. Such regeneration is effected by contacting the exhausted exchanger with a regenerant solution, herein also called the secondary solution, which contains the ions required by the exhausted exchanger in sufficient concentration to cause them to effect the exchange necessary for regeneration. The effect of the regenerant solution upon the exchanger is that the ions collected in the exchanger from the primary solution now migrate into the regenerant solution as they exchange for those ions in the regenerant solution, which the exchanger requires for its regeneration. That is to say, as regeneration proceeds, the ions removed by the exchanger from the primary solution will now be found increasingly in the regenerant solution. Eventually the spent regenerant solution or liquor may have in it substantially all the ions removed from the primary solution by the exchanger.

The operating phase in which the exchanger actively collects ions from the primary solution, together with the regenerating phase in which the exchanger is re-charged with needed ions, may be said to constitute the operating cycle of the exchanger. There are practical limits (due to equilibrium conditions between the exchanger and the solution), to which the regenerant chemical or regenerant solution can be utilized or converted by the exchangers, and at which still a satisfactory rate and degree of regeneration may be attained. The degree to which the regenerant solution is thus utilized or converted may herein be called the efficiency of regeneration. As the regeneration of the exchanger approaches completion, the intensity of ionic exchange becomes correspondingly reduced, that is to say, the proportion of utilized regenerant chemical becomes increasingly smaller because an equilibrium or near equilibrium establishes itself between the exchanger and the partially converted regenerant solution, and eventually approaches zero. The solution having been utilized or converted within these limits, is herein called the spent regenerant liquor. It will be seen that the concentration of the unused regenerant chemical in the spent liquor depends upon the degree of conversion, or otherwise expressed, upon the efficiency of regeneration.

This invention is concerned with the regeneration phase, and one object is to utilize the regenerant solution more effectively than has heretofore been possible, in order to effect a saving in regenerant chemical. In this respect the present invention is closely related to and may be suitably combined with the subject matter of my co-pending application, Ser. No. 383,087, in which I have described a method of improving the efficiency of regeneration by means of counter-current operation.

This counter-current regeneration procedure essentially means that, in order to regenerate an exhausted exchanger, the exchanger is first contacted with a largely, but not entirely spent solution obtained from a previous exchanger treatment. This solution would contain on the one hand some of the salt, base or acid used for regeneration, and on the other hand some of the resultant products of regeneration. This solution contains the unused regenerant chemical in a relatively low molar concentration which, however, is high enough to initiate the regeneration of, or to partially regenerate the exhausted exchanger. Because this partly spent solution is the first one to be applied to the exchanger, it shall herein be called the first stage regenerating solution. When this partly spent or first stage regenerating solution is passed through the exchanger the remainder of the unused regenerant chemical in the solution will have been largely converted to the products resulting from regeneration. An exchanger so treated will be partially regenerated.

After the first stage regenerating solution has been contacted with the exchanger bed, the bed is given a second treatment with a fresh regenerating solution to complete the regeneration. The solution resulting from this completion of the regeneration becomes the partly spent or first stage regenerating solution to be used as such in the treatment of the next exchanger bed to be regenerated.

What has just been described may be called a two-stage process, but correspondingly three or more stages can be used. Accordingly, there may be used successively a second and third stage partially used regenerating solution of consecutively greater strength, having been subjected to corresponding smaller degrees of conversion. The solution used in the last stage of regeneration of this exchanger is strong enough to effectively complete the regeneration of the exchanger, and this solution may be in the form of fresh solution of suitable strength. The essence of the counter-current regeneration is that the strong regenerant solution is re-used by passing it in effect through a succession of exchanger beds in various stages of regeneration. That is to say, the strongest regenerant solution contacts the least exhausted bed, while the weakest regenerant solution contacts the most exhausted bed. The regenerant chemical in the solution is accordingly stage-wise converted as the total molar concentration in the solution remains substantially constant.

It is desirable that the exchanger bed be submerged in liquid at all times, so that no air will become entrapped in the voids of the bed. Therefore, the regeneration is conducted in such a manner that one fraction of the regenerant solution is displaced from the bed by the next stronger fraction. After the fully regenerated condition of the exchanger has been reached, the exchanger must be washed free of the regenerant solution in it, that is to say, the remaining volume of strong regenerant solution that still fills the voids in the exchanger, must be displaced by wash water, whereupon the exchanger is again ready for use.

While the bulk of relatively unreacted regenerant solution thus displaced by the wash water may be re-used directly in my system of stagewise counter-current regeneration, such as referred to above, I have observed that some of this strong regenerant solution remains trapped in the voids of the exchanger and is subsequently found in a weak solution in the wash water. This dilute or weak portion of the regenerant solution is herein termed the trailing portion in distinction from the bulk of the undiluted solution that passes out first from the exchanger.

This trailing portion of unconverted or substantially fresh regenerant solution is too low in concentration to serve directly in the regeneration of the exchanger, and in mixture with the bulk portion of the undiluted solution, it would unduly lower the concentration thereof, and thereby reduce the total efficiency of regeneration. Therefore, in order to attain the object of this invention, I propose to preserve the regenerant value contained in this weak or trailing portion of the solution by using it as make-up liquid for fresh regenerating solution of suitable strength, that is of a concentration high enough to realize economically and effectively a desired degree of regeneration of the exchanger.

A feature of the invention resides in separately intercepting the strong or undiluted and the weak solutions as they flow from the exchanger, and to re-use them individually as a strong and a weak fraction in a manner whereby a maximum total efficiency of regeneration is obtained.

As illustrative of a form of construction by which the invention hereof may be realized, reference is made to the accompanying drawings constituting a part of this specification, and in which drawings.

Figure 1:
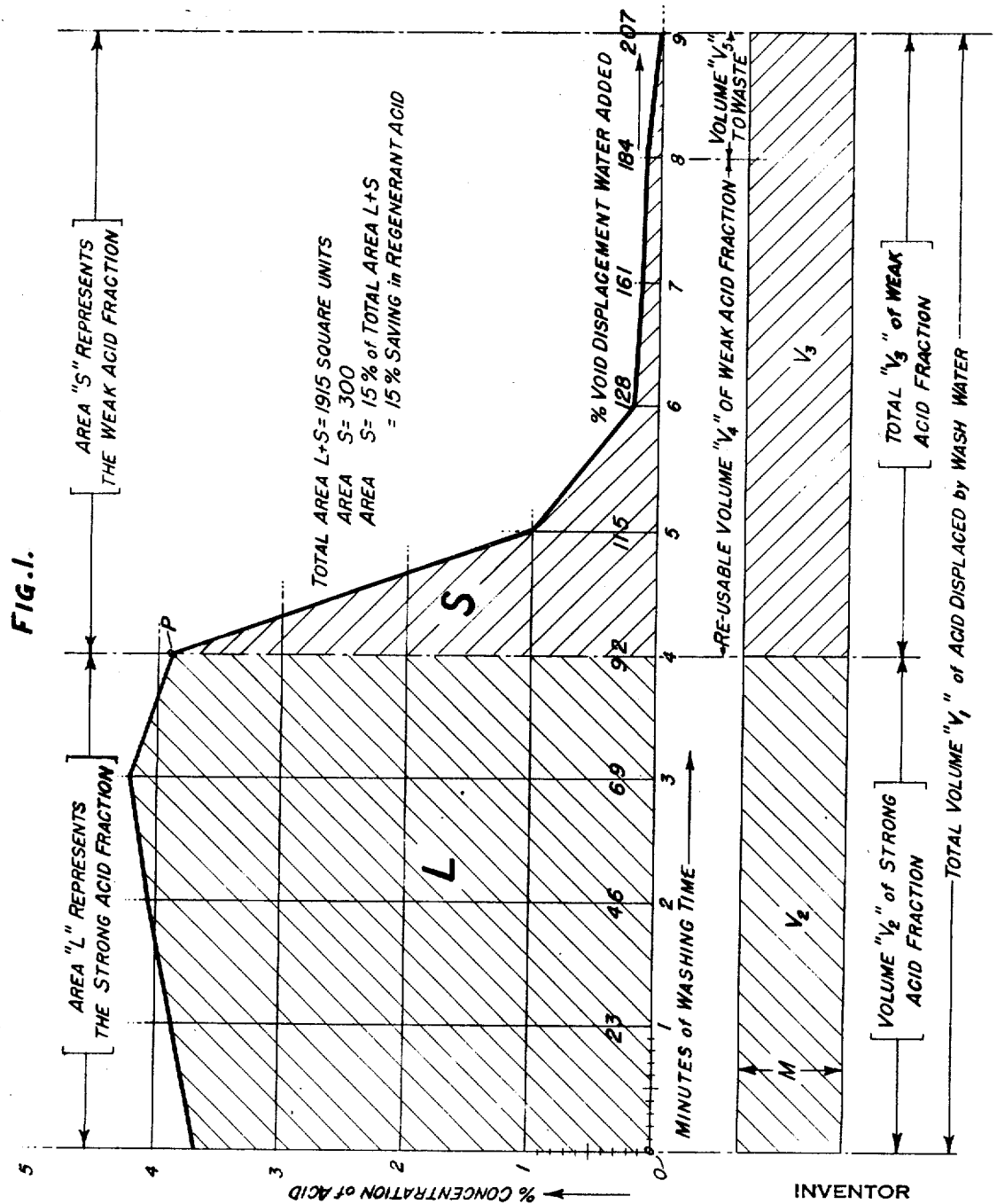
Fig. 1 is a diagram giving an approximate proportion by volume of the undiluted regenerant solution fraction to the trailing fraction or weak portion of the solution, in terms of diagram area.

The invention applies to the regeneration of cation and of anion exchangers, and it may also apply to processes in which both types of exchangers are used in combination. By way of example, reference is had to a process involving the purification treatment of clarified sugar-bearing juices in a succession of cation and anion exchangers, in which the cation exchanger operates in the hydrogen cycle and the anion exchanger in the hydroxyl cycle. Such treatment results in the removal from the juice of ionized salts or impurities or values in solution, with the net result that a quantity of such ionized matter in the juice is replaced with a molar equivalent of pure water. The ionized matter is transferred by this chemical exchange from the juice to the respective exchangers, subsequently to be found in the spent regenerant liquor. While the juice is thus being purified or freed of dissolved non-sucrose matter, any values present in the matter thus removed from the juice, may be said to be recoverable from the spent regenerant liquors.

When treating, for instance, clarified beet juice with exchangers for purification, I have used certain exchangers of organic resinous, and acid-resisting characteristics of a class now known as Organolites. As a cation exchanger I have used the one labeled IR 1 and produced by the Resinous Products & Chemical Co. To regenerate it, a solution of strong acid, for instance, HCl, $H_2SO_4$, $H_3PO_4$, or $HNO_3$, at suitable concentration, is passed through the bed. As an anion exchanger, I have used the one labeled IR 4 by the Resinous Products & Chemical Co., and which requires as a regenerant an alkali or alkali carbonate, for instance, NaOH, KOH, $Na_2CO_3$, $K_2CO_3$, $NH_4OH$. At the end of the regeneration phase the bed normally remains full of and submerged in substantially unconverted regenerant solution. Of this remaining volume at best only a very small proportion is utilized or converted because of the typical equilibrium nature of the exchanger reactions. For instance, if a 5% HCl solution were used in the regeneration of the cation exchanger, about 4.5% of the HCl may remain unreacted in this last acid in the bed, and I propose to recover as much as possible of this solution for re-use in regenerating subsequent exchanger beds.

If wash water commences to pass through the bed, the unused regenerant solution is pushed ahead of the water and for a time comes out at full strength and can be re-used in the subsequent regeneration stage. A sharp line of demarkation does not remain between the regenerant solution and the wash water, and some mixing takes place, so that, after a portion of the regenerant has been displaced, the effluent regenerant becomes progressively more dilute. The step that constitutes the essence of the invention is to separately collect this diluted regenerant herein called the trailing portion, and to use it to make up fresh strong regenerant for subsequent regenerations where its value can be utilized without the disadvantage of having it in a diluted form.

Fig. 1 shows graphically an example of the trailing characteristics of the solution in a coordinate system with starting point "0." It shows the concentration of the residual regenerant acid (HCl) in percent on the ordinate as a function of the through flow volume on the abscissa in terms of percent of void displacement water added. The void is herein understood to mean the space between exchanger granules in percent of the total volume of the exchanger bed.

It is based upon the titration of the residual unreacted hydrogen ion of the effluent solution, although it might be more aptly represented by the molar concentration curve, since molar concentration is the true criterion of the dilution of the solution as such, and therefore representative of the trailing characteristics. It will be understood that in this way a distinction is being drawn between the degree of concentration of the regenerant chemical in the solution and the molar concentration of ionic matter in general in the solution. In view of this definition, it should also be understood that in the present counter-current operation the molar concentration of the regenerant solution remains substantially constant as the solution passes through the various stages, even though the regenerant chemical is being stage-wise converted into the molar equivalent of another compound as will be more fully explained below.

The graph in Fig. 1 is based upon data obtained from actual operation in which I have subjected clarified cane sugar juice to ionic purification treatment by means of a combination of cation and anion exchangers. This graph represents the phase in which regenerant acid solution (HCl) is being displaced by wash water from the cation exchanger bed.

The following are data underlying this graph:

*Type of granular exchanger used.*—Labelled IR I, a product of the Resinous Products & Chemical Co.

The following schedule represents the progress of the final displacement of hydrochloric acid regenerant solution from a cation (IR I) exchanger bed by wash water. It is based on a test in which wash water at a rate of one gallon per cubic foot per minute is passed through an exchanger bed of 60% voids and of 3.5' depth.

| Minutes of washing time | Percent void displacement, in terms of displacement water added | Percent HCl in effluent at instant |
| --- | --- | --- |
| 1 | 23 | 3.88 |
| 2 | 46 | 4.95 |
| 3 | 69 | 4.19 |
| 4 | 92 | 3.86 |
| 5 | 115 | 0.93 |
| 6 | 138 | 0.19 |
| 7 | 161 | 0.09 |
| 8 | 184 | 0.06 |
| 9 | 207 | |

The graph in Fig. 1 is obtained by plotting from the foregoing schedule the values of the concentration of the regenerant acid (percent HCl) as a function of the through-flow volume in terms of percent void displacement water added. A relatively sharp decline in the concentration commences in this case at the point P in the graph, which corresponds to the through-flow volume at a flow rate of 1 gal. per cubic foot per minute. This point may be considered as the break at which the weak acid fraction or trailing portion of the regenerant solution is to be intercepted as according to this invention. The point of break or interception P in the graph of Fig. 1 defines an area L to the left of it, that represents proportionately the bulk of the strong acid fraction, and to the right of it a small area S representing in proportion the weak acid fraction in the trailing part of the through-flow volume. The respective areas L and S are proportionate in size to the content of the regenerant (acid) in the solution. Since the total area L plus S covers approximately 1915 square units as measured in this graph, and the area S 300 square units, or about 15% of the total area, it thus appears that about 15% of the displaced regenerant can be made use of in the preparation of a fresh batch of strong regenerant solution assuming that in this instance the area L plus S represents substantially the total of unconverted regenerant that is being displaced by the wash water from the exchanger bed.

Below the abscissa of the graph in Fig. 1 are plotted the volumes of the fractions corresponding to the areas L and S respectively. If M indicates the diameter of the bed or its free cross-sectional area, then the rectangular area $V_2$ may be said to represent the volume of the bulk of the strong acid regenerant solution that is to be re-used directly in subsequent counter-current regeneration stages, while the rectangular area $V_3$ represents the volume of the trailing or weak solution, part or all of which is to be re-used for making up fresh strong solutions. The total through-flow volume, in this instance, the sum of the areas $V_2$ plus $V_3$ is designated as $V_1$, and it represents the total volume of wash water required for displacing and washing regenerant acid from the exchanger bed. In case the volume $V_3$ of the weak acid fraction is excessive, that is to say, larger than the volume of the fresh regenerant acid solution (or otherwise expressed, larger than the volume of regenerant solution which is in transit through the system during one regeneration operation), the excessive portion of the volume obtained at the end of the washing step constitutes a highly dilute, that is in effect a very small quantity of acid proper, the loss of which is almost negligible if it is sent to waste.

Accordingly, the diagram in Figure 1 shows the total volume $V_3$ of the weak acid fraction as being further subdivided into the major re-usable volume $V_4$ and the small waste volume $V_5$. The re-usable volume $V_4$ is shown to be approximately equal to the volume $V_2$ of the strong acid fraction, and its acid content corresponds to the major portion of the shaded area S, while the acid content of the waste volume $V_5$ corresponds to the area of the narrow pointed triangular portion at the extreme right-hand end of the diagram in Fig. 1.

Figure 2:
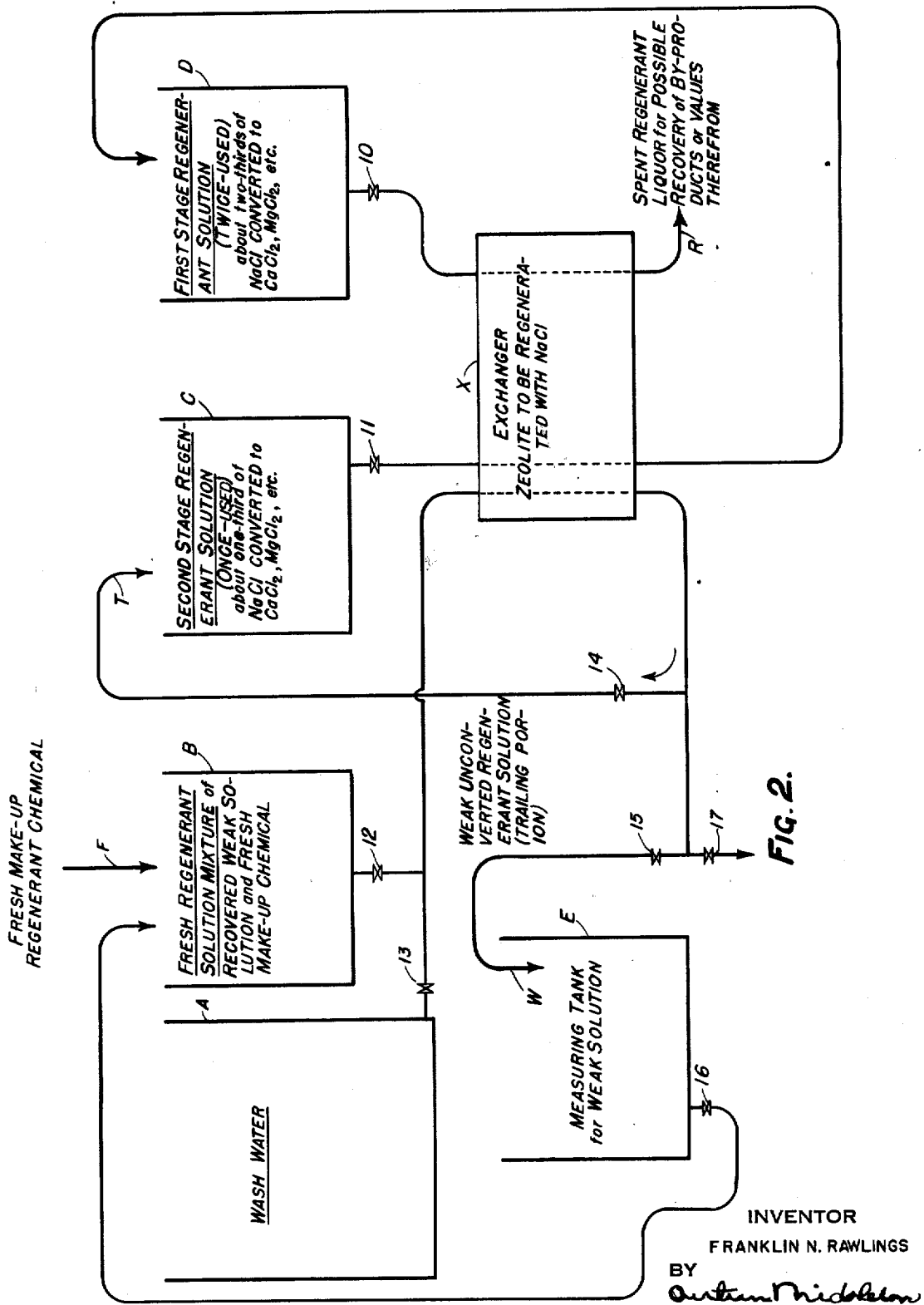
Fig. 2 is a flowsheet embodying the invention in conjunction with counter-current regeneration.

By way of illustration, Fig. 2 shows a flowsheet embodying the feature of re-using the trailing portion of unconverted acid or weak solution fraction in conjunction with counter-current regeneration, such as herein defined. In this example, there is merely shown what is herein termed as two-stage counter-current regeneration, although additional stages could be provided to operate counter-currently as a part of this system.

The system according to Fig. 2 comprises an exchanger X herein assumed to be a zeolite in exhausted condition, which is to be regenerated with NaCl solution of a suitable concentration, a tank B for fresh regenerant solution, a tank C for once-used regenerant solution in which about one-third of the regenerant chemical NaCl is assumed to have been converted to $CaCl_2$, $MgCl_2$, etc., furthermore, a tank D for twice-used regenerant solution in which about two-thirds of the regenerant chemical NaCl is assumed to have been converted, a tank A for the wash water to displace regenerant solution from the exchanger bed, and a measuring tank E for the re-usable volume of the weak solution or trailing portion of the regenerant solution that is being displaced by wash water. The operation of the flowsheet of Fig. 2 is, as follows:

The zeolite exchanger X being exhausted, there is first sent through it from tank D by way of a valve 10 a batch of twice-used, that is largely converted regenerant solution that has been obtained from a previous regeneration operation. As this solution passes through the bed, it displaces wash liquid initially present in the bed, and partially regenerates the exchanger. The effluent regenerant liquor which is herein termed spent regenerant liquor R flowing from this bed may be further treated to effect a recovery therefrom of by-products or values.

Next, a batch of once-used regenerant solution is passed from tank C by way of a valve 11 through the exchanger X, which solution is assumed at this time to have only about one-third of its NaCl content converted. It displaces from the bed the twice-used solution that has remained from the preceding treatment step and in passing through the bed, the regenerant in the once-used solution will become further converted and the exchanger correspondingly further regenerated until substantially another equilibrium condition between exchanger and solution is reached. The solution flowing from the exchanger contains sufficient unconverted regenerant NaCl to serve as a batch of twice-used solution and is routed to refill the tank D.

Thereafter, fresh or substantially unconverted regenerant solution is passed from tank B by way of a valve 12 through the exchanger X to finish the regeneration thereof. Again, the remaining once-used solution that has remained in the bed from the preceding step is displaced from the bed by the fresh solution, while the regenerant in the fresh solution becomes partially converted and the exchanger correspondingly further regenerated, until again substantially another equilibrium between solution and exchanger is established. The solution flowing from the exchanger being converted only to a given extent, is passed on to refill the tank C where it serves as once-used regenerant solution in a future regeneration operation. The completion of the regeneration of the exchanger is indicated when the effluent solution appears to be a strong, that is largely unconverted solution.

The regeneration of the exchanger now being substantially completed, wash water from tank D is then passed by way of valve 13 through the exchanger, displacing the remaining unconverted regenerant solution from the bed. The displaced solution is then intercepted in fractions comparable to those described in connection with the graph in Fig. 1, namely, a strong or undilute solution fraction comparable to that represented by the area L, which goes into the making of once-used solution for tank C, and a weak solution fraction comparable to that represented by the area S and containing the trailing portion of the displaced regenerant. The strong or undiluted solution fraction designated as T having been displaced is allowed to pass through valve 14 into tank C while valves 15 and 17 are closed. After a solution volume comparable to the volume $V_2$ in Fig. 1 has been displaced and transferred to tank C, valve 14 is closed and a further solution volume W containing the trailing dilute or weak regenerant (comparable to the volume $V_3$ in Fig. 1), is allowed to pass through valve 15 into the measuring tank E while valves 14 and 17 are closed. The solution volume W is then transferred through valve 16 to the tank B where fresh acid or fresh regenerant chemical F is added to make up the required fresh regenerant solution volume of predetermined required molar concentration. After the required re-usable volume of weak or trailing regenerant acid has filled the measuring tank E, any excess volume thereof, that is highly dilute, may be disposed of by discharging it through valve 17 after valve 15 has been closed.

The required minimum size of the solution tanks B, C, D and the mixing and storage tank E and the wash water tank A may be determined for a given set of operating conditions by determining the solution volumes and the wash water volume, and the trailing solution volume involved. The determination of the regenerant solution volume required for regeneration is based upon the gram-molecular equivalent cubic foot of the exchanger material, that is the effective exchange capacity of the exchanger. This in turn determines the volume of solution to be sent through the exchanger bed at a desired concentration of the regenerant chemical therein. This volume represents the minimum required capacity of the tanks containing the active regenerant solutions at various degrees of conversion, that is, first-used, second-used, etc., regenerant solutions.

It will be understood that the molar concentration of the displaced strong or undilute regenerant solution will remain substantially constant as the solution passes through the subsequent treatment stages, that is, tanks B, C and D, even though the regenerant chemical itself becomes less and less concentrated in the stagewise progress of conversion.

It will also be understood that the intercepted unconverted trailing portion of the displaced regenerant solution does not pass on to the subsequent regeneration stages, but is returned and enters into fresh regenerant solution being made up. Consequently, the fresh solution in tank A will have a molar concentration that is higher than that in the subsequent tanks B, and C by an amount corresponding to the molar concentration of the trailing portion, on the assumption that all solution tanks B, C, and D are to handle the identical solution volume. By the same token, that is, because of the return of the trailing portion of the regenerant, if the molar concentration in all tanks, including tank B, is desired to be alike, then it follows that the capacity of tank B must be made correspondingly larger than that of either tank C or tank D.

For example, if a predetermined volume of regenerant solution of 5% concentration of the regenerant, which in this case also is assumed to represent the molar concentration of the solution, is needed to satisfy the regeneration requirement of an exhausted exchanger bed, and if 10% of the regenerant chemical in this solution is assumed to be diverted in the trailing portion of the solution incident to its displacement by wash water, then the concentration of the fresh solution in tank A should also be 10% greater than the theoretically required concentration. That is to say, the concentration should be 5.5% if tank B is to have the same minimum capacity as tank C and tank D. But, if the fresh solution in tank B is to have the same molar concentration (for instance 5%) as either tank C or tank D, then tank B should have a 10% larger capacity than the solution tank C or D of the subsequent treatment stages.

I claim:

1. A method of regenerating an ionic exchanger bed, which comprises passing through the bed a volume of solution containing regenerant chemical obtained from a previous regeneration operation whereby the chemical is further spent as the exchanger becomes increasingly regenerated, displacing solution remaining in the bed by the act of passing therethrough a volume of solution containing full strength regenerant chemical, passing wash water through the bed to displace therefrom the portion of the last-mentioned solution remaining in the bed, and fractionating the thus displaced effluent liquid by intercepting and collecting a first portion thereof having at least an appreciable concentration of unspent regenerant chemical therein, and by intercepting and collecting a second portion thereof in which unspent regenerant chemical is dilute and diffused with said wash water, adding to said dilute portion sufficient regenerant chemical to produce regenerant solution that is stronger in regenerant chemical than the first intercepted volume, and sequentially applying said first and said second portion in the subsequent regeneration of a bed.

2. In a method of regenerating an ionic exchanger bed, in which solution containing unspent regenerant chemical remains in the bed at the end of the regeneration phase thereof, the steps of passing wash water through the bed to displace therefrom said remaining solution, fractionating the thus displaced effluent liquid by intercepting and collecting a first portion thereof having at least an appreciable concentration of unspent regenerant chemical therein, and by intercepting and collecting a second portion thereof in which unspent regenerant chemical is dilute and diffused with wash water, adding to said dilute portion of effluent sufficient regenerant chemical to produce regenerant solution that is stronger in regenerant chemical than the first intercepted portion, and sequentially applying said first and said second portion in the subsequent regeneration of a bed.

FRANKLIN N. RAWLINGS.